United States Patent [19]

Spies

[11] Patent Number: 5,598,563

[45] Date of Patent: Jan. 28, 1997

[54] METHOD OF LOADING DEVICE DRIVERS FROM ROM WITHOUT REQUIREMENT OF SYSTEM TO HAVE ANY HARDDISKS OR FLOPPY DRIVES AND WITHOUT USING CONFIG.SYS FILE

[75] Inventor: Terence R. Spies, Redmond, Wash.

[73] Assignee: Microsoft Corporation, Redmond, Wash.

[21] Appl. No.: 285,485

[22] Filed: Aug. 3, 1994

Related U.S. Application Data

[63] Continuation of Ser. No. 976,945, Nov. 16, 1992, abandoned.

[51] Int. Cl.$^6$ ................................................. G06F 9/445
[52] U.S. Cl. ........................... 395/652; 395/500; 395/681; 364/DIG. 1; 364/246.3; 364/280; 364/280.2
[58] Field of Search ............................................. 395/700

[56] References Cited

U.S. PATENT DOCUMENTS

| | | | |
|---|---|---|---|
| 4,589,063 | 5/1986 | Shah et al. | 364/200 |
| 5,012,514 | 4/1991 | Renton | 380/4 |
| 5,136,709 | 4/1992 | Shirakabe et al. | 395/700 |
| 5,404,494 | 4/1995 | Garney | 395/500 |
| 5,412,978 | 5/1995 | Garney | 395/500 |

FOREIGN PATENT DOCUMENTS 2203869  10/1988  United Kingdom.

OTHER PUBLICATIONS

Personal Computer Memory Card International Association, "PCMCIA Standards", Release 2, excerpts, CA, Nov. 1992.
Gibson, Steve, "Device Driver 'Stubs' Smooth Path to Top SCSI Performance", *Tech Talk*, p. 33, Nov. 19, 1990.
Mitchell, Stan, "Building Device Drivers", *PC Tech Journal* 3(5):76–95, May 1985.

*Primary Examiner*—Alvin E. Oberley
*Assistant Examiner*—Jonathan Hall Backenstose
*Attorney, Agent, or Firm*—Seed and Berry LLP

[57] ABSTRACT

A method for storing device drivers in the adapter region of a computer's address space includes the step of providing a plurality of headers and associating each header with a device driver to be loaded and initialized. Each header includes instructions for loading and initializing its associated device driver. Further, each header includes information for identifying the address next following its device driver. The method further includes the step of storing the plurality of device drivers and their corresponding headers in an address space having addresses that are sequential. Further, each header is stored in an address space having addresses that are sequential with the addresses of the address space occupied by its corresponding device driver. A method is also disclosed for loading the plurality of device drivers stored in the manner discussed above. The method for loading comprises the step of locating a header and executing the instructions for loading and initializing its corresponding device driver. Thereafter, the driver size identifier is used to identify the location of the header next following the device driver just loaded.

25 Claims, 3 Drawing Sheets

METHOD OF LOADING DEVICE DRIVERS FROM ROM WITHOUT REQUIREMENT OF SYSTEM TO HAVE ANY HARDDISKS OR FLOPPY DRIVES AND WITHOUT USING CONFIG.SYS FILE

CROSS-REFERENCE TO RELATED APPLICATION

This application is a continuation of U.S. patent application Ser. No. 07/976,945, filed Nov. 16, 1992, now abandoned.

TECHNICAL FIELD

The present invention is directed toward a method for loading device drivers and, more particularly, a method for loading device drivers without changing the underlying drivers, without using a disc memory, and with minimum overhead.

BACKGROUND OF THE INVENTION

Personal computers are becoming more and more commonplace in today's society. Personal computers typically include a central processing unit (CPU) that is controlled by basic instructions referred to as the operating system of the computer. Generally, the personal computer requires one or more peripheral devices to extend its capabilities. Typical peripheral devices include keyboards, display screens, printers, disc drives, modems, etc. Typically, a device driver is required to interface the operating system of the personal computer with the peripheral devices.

Device drivers are small computer programs that receive instructions and data from the operating system that are independent of the peripheral device for which the instructions and data are intended. The device driver responds to the device independent instructions and data from the operating system to provide instructions and data to the peripheral device that are dependent upon the nature and construction of the particular peripheral device. Accordingly, device drivers will typically provide additional information to the peripheral device to enable the peripheral device to perform the functions requested by the operating system. By providing different device drivers with different peripheral devices, the operating system of the computer can interface with peripheral devices made from different manufacturers.

So that the personal computer can interface with all of its peripheral devices, the device drivers must be loaded into the computer memory and initialized prior to operation of the personal computer. Typically, loading the device drivers usually occurs when the personal computer is turned on. When the personal computer is turned on, the operating system performs functions necessary prior to operation. As mentioned above, one of these functions is to load the device drivers from a permanent storage location into the computer memory.

Presently, two methods exist for loading and initializing device drivers into the computer memory when the computer is turned on. The first method relies upon configuration data, a file typically called CONFIG.SYS., being stored in the computer's memory to determine which device drivers are stored in permanent memory and to load and initialize these device drivers. When a new device, and device driver, are added to the personal computer, the CONFIG.SYS file is updated to include information identifying the new driver, its location on the disk, and the location of its initialization program. Accordingly, when the CONFIG.SYS file is accessed, it includes all necessary information to locate each device driver and the routine for loading and initializing the device driver. The operating system uses the CONFIG.SYS file to execute these routines so that each device driver is loaded and initialized.

The other presently available method for loading and initializing device drivers is referred to as ROMDOS. The ROMDOS method enables the device drivers to be stored in read only memory (ROM). To load the device drivers, however, the ROMDOS method relies on the CONFIG.SYS file. Accordingly, the ROMDOS method must provide instructions and data to simulate a hard disk so that the device drivers stored in read only memory (ROM) can be accessed using the CONFIG.SYS file. Further, the ROMDOS method relies upon a subprogram, typically referred to as CONFPROC.SYS, to interface with the CONFIG.SYS file thereby enabling the CONFIG.SYS file to identify and load the device driver stored in read only memory. Although effective, this method requires unnecessary memory for storing the CONFPROC.SYS subprogram. Further, this method creates additional inefficiencies in operating the computer and in storing the device drivers.

Accordingly, it is desirable to provide a method for storing device drivers in read only memory so that the device drivers can be loaded with minimum storage overhead and without changing the underlying device drivers.

SUMMARY OF THE INVENTION

The present invention is a method for storing a plurality of device drivers in the adapter region of an address space of a computer so that the device drivers can be loaded into a computer memory of the computer. The method includes the steps of providing a header for each device driver wherein each header includes instructions and data for loading its respective device driver and wherein each header includes a driver size identifier. The method further includes the step of storing the plurality of device drivers and headers in a portion of the adapter region so that each header occupies an address space with addresses that are in sequence with the addresses of the address space occupied by its respective device driver. The plurality of device drivers and headers are further stored so that they occupy an address space having addresses that are sequential. The driver size identifier of each header is provided to identify the number of addresses of the address space occupied by the header and its respective device driver. The plurality of device drivers and headers are further stored so that the first address of a subject header and its driver size identifier can be combined to provide the first address of another header next following the subject header.

In operation, the method includes the steps of identifying a current driver scan address. The method also includes the step of accessing the current driver scan address and determining whether the information stored at the current driver scan address is associated with a header and, if so, performing the remaining steps, and, if not, determining that all drivers have been loaded. After the current driver scan address has been accessed, the instruction of the header associated with the current driver scan address are executed to load the device driver associated with the header. Thereafter, a driver size identifier of the header is accessed and combined with the current driver scan address to identify the new current driver scan address. The method is repeated until the determination is made that all drivers have been loaded.

DETAILED DESCRIPTION OF THE INVENTION

The present invention is a method for storing device drivers in the adapter region of a computer's address space. Further, the subject invention includes the method for loading the device driver into the computer's memory from the adapter region.

As is known in the art, personal computers are typically provided with a central processing unit (CPU) that defines an address space of the computer. The address space is typically divided into an adapter region, sometimes referred to as an upper memory region or adapter memory, and computer memory. Commonly, the computer memory refers to random access memory (RAM) that is used by the computer for storing programs, instructions, data, and other information with which the central processing unit is currently working. The adapter region is commonly used for positioning memory and other devices to be accessed by the central processing unit at times when it is not accessing its computer memory.

A particularly unique feature of the present invention is the ability to store device drivers in the adapter region of the computer's address space. The device drivers are stored in a manner so that the amount of memory necessary to store additional information for loading and initializing the device driver is minimized. A data structure 100 illustrating the manner in which the device drivers are stored in the adapter region is shown in FIG. 1.

Figure 1:
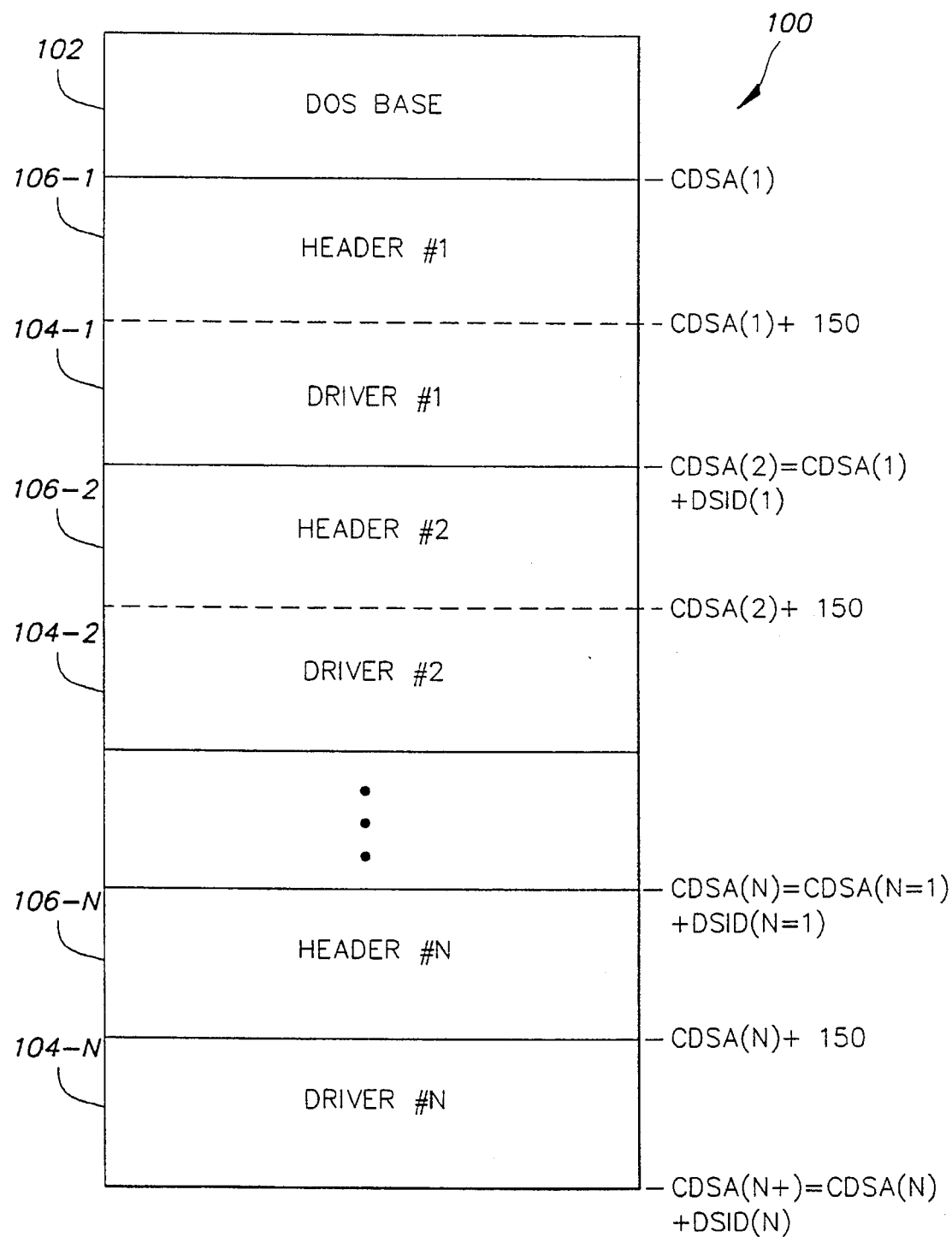
FIG. 1 is a diagram illustrating the data structure for storing device drivers in the adapter region of a computer's address space.

The data structure 100 includes an operating system portion 102, referred to in FIG. 1 as DOS Base. The operating system portion 102 is a portion of the operating system of the computer that is stored in the adapter region for facilitating the identification, loading, and initialization of the device drivers, as will be described more fully below. The operating system portion 102 is preferably stored at a predetermined address of the adapter region so that it can be readily identified by the remaining portion of the computer's operating system. However, it will be apparent to those skilled in the art that many techniques can be employed to identify the operating system portion 102.

Generally, the operating system portion 102 is provided to identify the location of the device drivers to be loaded into the computer's memory. For this reason, the operating system portion 102 illustrated in FIG. 1 includes an operating system size identifier for identifying the size of the operating system portion. Preferably, the plurality of device drivers will immediately follow the operating system portion 102, as will be discussed below. Therefore, by identifying the size of the operating system portion 102, i.e., the number of addresses associated with the address space occupied by the operating system portion, then the first address of the operating system portion can be mathematically combined with the operating system size identifier to provide the identity of the first address wherein the device driver information will be found.

The operating system portion 102 further includes a common driver signature that is used to identify each device driver, as will be discussed more fully below.

Figure 2:
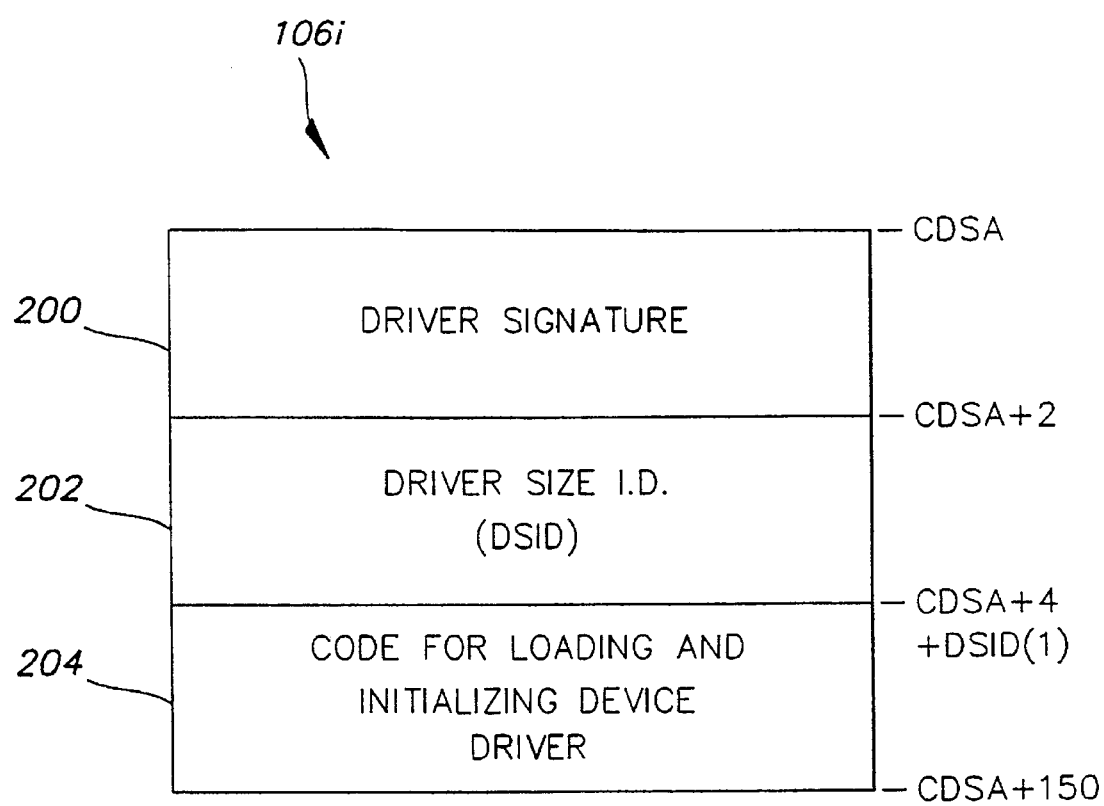
FIG. 2 is a diagram illustrating the data structure for a header to be associated with a device driver as shown in FIG. 1.

The data structure 100 further includes a plurality of device drivers 104-1 through 104-N, where N is the total number of device drivers stored. In accordance with the subject invention, a plurality of headers 106-1 through 106-N are each associated with a respective device driver. As shown in FIG. 2 with respect to one header 106-i, the plurality of headers include a driver signature 200 (FIG. 2), a driver size identifier (DSID) 202, and instructions and data 204 for loading and initializing its associated device driver 104-i (not shown).

In accordance with the presently preferred embodiment of the invention, the common driver signature 200 that is stored in the operating system portion 102, as discussed above, is also stored at the first address of the header 106-i, the first address being referred to herein as the current driver scan address (CDSA). Further, the common driver signature 200 is a 2 byte signature followed by the driver size identifier (DSID) 202. The driver size identifier 202 occupies another 2 bytes of memory and is followed by the instructions and data 204.

An important aspect of the subject invention is that the operating system portion 102 is able to locate each header. Accordingly, by knowing the current driver scan address (CDSA) of any header 106-i, the computer can access the common driver signature 200, the driver size identifier (DSID) 202, or the instructions and data 204 for loading and initializing the associated device driver. Still further, by knowing the current driver scan address (CDSA), the computer also knows the first address of the associated driver 104-i.

Returning to FIG. 1, in accordance with the present invention, the plurality of device drivers and headers are each stored in a portion of the adapter region directly following the operating system portion 102. With reference to FIG. 1, it will be understood that the address space occupied by the operating system portion 102 has addresses that are lower than the addresses occupied by the header 106-1. Similarly, the addresses of the address space occupied by the header 106-1 are lower than the addresses of the address space occupied by the driver 104-1, etc. It is significant, however, that the addresses of the address space occupied by the drivers 104-1 through 104-N and the headers 106-1 through 106-N are sequential. It will be further appreciated that the header 106-1 associated with the driver 104-1 occupies an address space having addresses that are sequential with the addresses of the address space occupied by its associated driver 104-1. In this manner, the driver size identifier referred to in FIG. 2 can be combined with the current driver scan address and the predetermined size of the header to determine the location of the next header 106-i and its associated driver 104-i to be loaded. In this manner, the plurality of drivers can be readily identified, loaded, and initialized using the headers 106-i.

Figure 3:
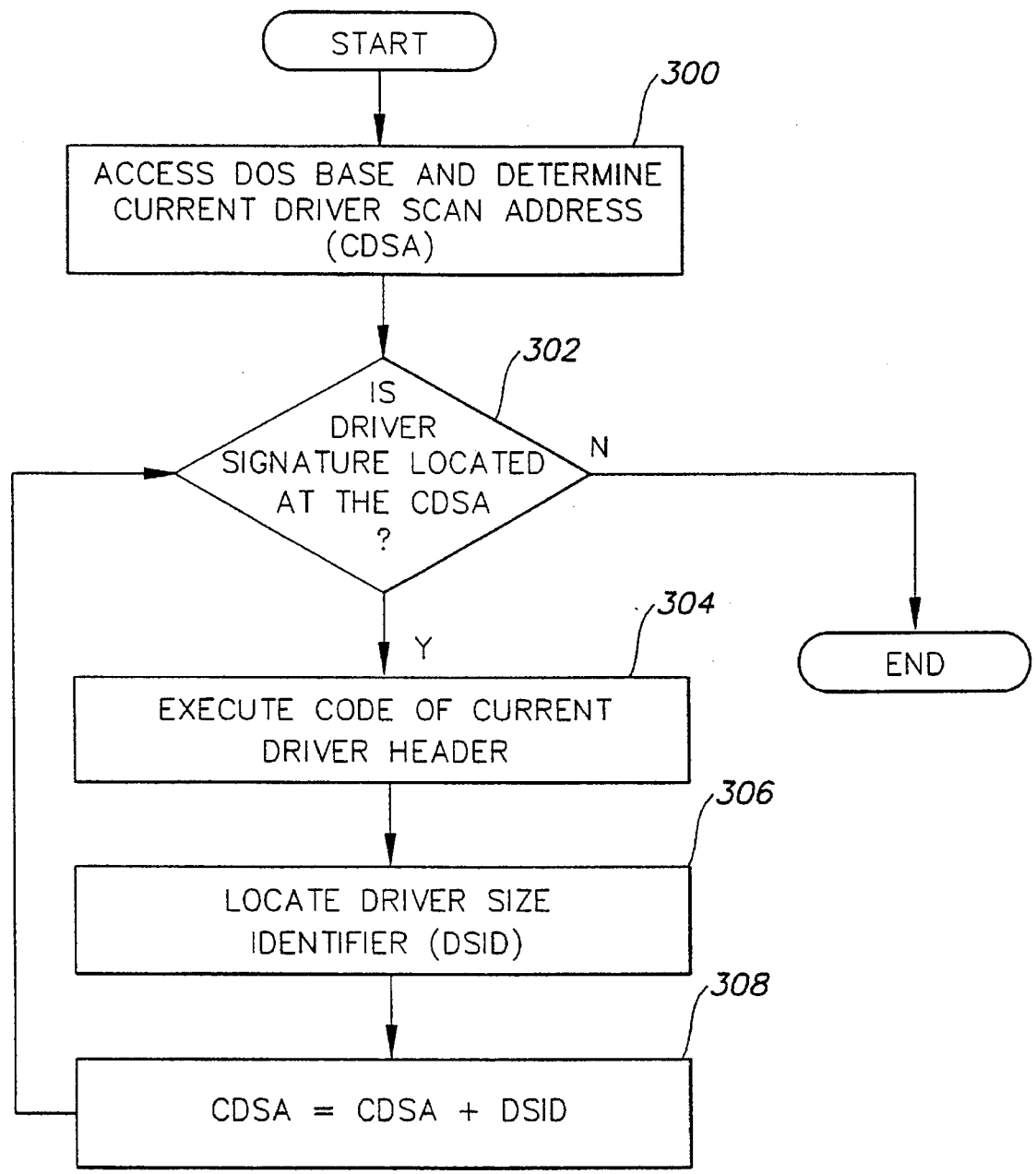
FIG. 3 is a decision flow diagram illustrating the method for loading device drivers from the adapter region of a computer's address space.

Referring to FIG. 3, a decision flow diagram is provided illustrating the method for identifying the device drivers to be loaded into the computer memory. Initially, the operating system of the computer will locate and access the operating system portion 102 (DOS Base) and determine a current driver scan address (CDSA), step 300. As discussed above, the operating system portion 102 includes an operating system size identifier for determining the first address following the operating system portion 102. That address is identified as the current driver scan address (CDSA).

After determining a current driver scan address (CDSA), the computer determines whether the information located at the current driver scan address (CDSA) is the common driver signature 200 (FIG. 2) and, if not, determines that all device drivers have been loaded, step 302. If, however, the information located at the current driver scan address (CDSA) is the common driver signature, then the computer will execute the instructions and data 204 of the header 106-i to load and initialize the device driver 104-i, step 304. After the device driver has been loaded and initialized, the computer will locate the driver size identifier (DSID) 202 of the header 106-i, step 306. The driver size identifier (DSID) 202 is then combined with the current driver scan address (CDSA) to determine the new current driver scan address, step 308. Thereafter, step 302 is repeated to determine whether the new current driver scan address includes a driver signature.

It will be apparent to those skilled in the art that, when the driver signature is found, the computer knows it has located still another header and, therefore, determines that another device driver remains to be loaded and initialized. Further, since the plurality of headers and device drivers are stored in a portion of the address space of the adapter region having sequential addresses, if the new current driver scan address (CDSA) does not include the driver signature, then all device drivers have been loaded.

Still further, significant advantages can be realized from the method of the subject invention. Generally, in accordance with the above-described method of the subject invention, the operating system will provide the header 106-i with a pointer to an address where the device driver is to be loaded. During execution of step 304, the header will load the device driver at the address indicated by the pointer so that the device driver is loaded into the computer's memory for operation. However, an alternative method for operating the device driver permits the device driver to be executed directly from the read only memory positioned in the upper memory region of the computer's address space. In accordance with this method, the operating system passes a pointer to the header to identify where the device driver is to be stored. However, instead of storing the complete device driver in the computer's memory, the header will only store variables needed during operation of the device driver along with a small number of instructions and data to identify where the device driver is stored in the upper memory region. The complete device driver code will not be copied into the computer's memory space. Thereafter, access to the device driver will be in the upper memory region via the small driver identification code loaded in the computer's memory. This method of operation provides significant savings in the random access memory of the computer.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

I claim:

1. A method for providing access to a device driver in a computer system during bootstrap initialization, the computer system having computer memory with an adapter region and a conventional random access memory region, each memory region having memory addresses, the computer system having a read only memory unit containing an operating system portion, initialization code for setting up access to the device driver, and the device driver, the initialization code having a location on the read only memory unit and containing a device driver execution stub, the method comprising the computer-implemented steps of:

physically mapping the read only memory unit into the adapter region of computer memory so that at least a portion of the read only memory unit is accessible through adapter region memory addresses;

transferring control to the operating system portion stored on the read only memory unit;

under control of the operating system portion being executed from the read only memory unit, determining the location of the initialization code on the read only memory unit and transferring control to the determined location of the initialization code; and under control of the initialization code being executed from the read only memory unit, copying the device driver execution stub to the conventional random access memory region, the stub containing instructions for accessing the device driver such that when code executes the stub, the stub transfers control to the device driver in the adapter region of computer memory.

2. The method of claim 1, the initialization code containing device driver data, wherein the step of copying the device driver execution stub to the conventional random access memory region further comprises the step of copying the device driver data to the conventional random access memory region to allow the device driver to modify the device driver data.

3. The method of claim 1 wherein the computer system operates without a disk drive and access to the device driver is provided without emulating a disk drive.

4. The method of claim 1 wherein the operating system portion is part of an MS-DOS compatible operating system.

5. The method of claim 1 wherein the initialization code is stored on the read only memory unit in a driver header.

6. The method of claim 5 wherein the driver header includes an indication of the size of the driver to aid in providing access to another device driver located on the read only memory unit.

7. The method of claim 1, wherein the computer system is an embedded system that is embedded in another device, and wherein the read only memory unit having the operating system, initialization code, and the device driver is mounted on a motherboard, such that access to the device driver is provided by executing code located on the motherboard.

8. The method of claim 7, wherein the computer system does not have any adapter cards.

9. A computer-readable memory device for controlling a computer system to perform the method of claim 1.

10. A method for loading a plurality of operating system device drivers in a computer system with an MS-DOS compatible operating system, each device driver having a corresponding header with initialization code, the computer system operable without a storage disk and without a configuration data file that specifies which device drivers to load, the computer system having computer memory with an adapter region and a conventional random access memory region, the computer system having a read only memory unit containing an operating system portion of the MS-DOS compatible operating system and the plurality of device drivers with their corresponding headers stored sequentially on the read only memory unit, the method comprising the computer-implemented steps of:

physically mapping the read only memory unit into the adapter region of computer memory; and during the computer system boot procedure, transferring control to the operating system portion stored on the read only memory unit;

under control of the operating system portion being executed from the read only memory unit, computing the location of a selected header and transferring control to the initialization code of the selected header;

under control of the initialization code of the selected header being executed from the read only memory unit, copying the corresponding device driver to the conventional random access memory region;

under control of the operating system portion being executed from the read only memory unit, computing the location of a next selected header; and repeating the steps of copying the corresponding device driver to the conventional random access memory region and computing the location of a next selected header until all of the plurality of device drivers have been loaded, thereby enabling the MS-DOS operating system to load the plurality of device drivers without a storage disk and without a configuration file that specifies the next device driver to load.

11. The method of claim 10, each header having a shared signature identifying that the header is for a device driver, wherein the step of computing the location of a next selected header further comprises the substep of determining whether the shared signature is present in the header, and wherein the step of repeating the steps of copying the corresponding device driver and computing the location of a next selected header terminates when the substep of determining detects that the shared signature is not present.

12. The method of claim 10, the read only memory unit having a base address in the adapter region, the operating system portion having an operating system size and stored on the read only memory unit preceding the plurality of device drivers with their corresponding headers, each header having a location on the read only memory unit and stored on the read only memory unit preceding the corresponding driver, wherein the step of computing the location of a selected header is accomplished by adding the operating system size to the base address of the read only memory unit in the adapter region.

13. The method of claim 10, the operating system portion having an operating system size and stored on the read only memory unit preceding the plurality of device drivers with their corresponding headers, each header stored on the read only memory unit preceding the corresponding device driver, each header having a location on the read only memory unit, a header size, and an indication of the size of the corresponding device driver, wherein the step of computing the location of the next selected header is accomplished by adding the operating system size, the size of the selected header, and the size of the driver corresponding to the selected header to the base address of the read only memory unit in the adapter region.

14. The method of claim 13 wherein each header size is a fixed size.

15. The method of claim 10 wherein one of the plurality of device drivers is structured for loading from a storage disk, and wherein the header corresponding to the one device driver enables the one device driver to be loaded from the operating system read only memory unit instead of from the storage disk.

16. A method for providing access to a plurality of device drivers in a computer system, each device driver having a corresponding header with initialization code for loading the device driver and an execution stub for the corresponding device driver, the computer system having computer memory with an adapter region and a conventional random access memory region, the computer system having a read only memory unit containing an operating system portion and the plurality of device drivers with their corresponding headers, the initialization code of each header having a location on the read only memory unit, the method comprising the computer-implemented steps of:

physically mapping the read only memory unit into the adapter region of computer memory;

transferring control to the operating system portion stored on the read only memory unit;

under control of the operating system portion being executed from the read only memory unit, computing the location of a selected header;

determining the location of the initialization code of the selected header; and transferring control to the determined location of the initialization code; under control of the initialization code being executed from the read only memory unit, copying the device driver execution stub to the conventional random access memory region, the stub containing instructions for accessing the device driver such that when code executes the stub, the stub transfers control to the device driver in the adapter region of computer memory;

under control of the operating system portion being executed from the read only memory unit, computing the location of a next selected header; and repeating the steps of copying the corresponding device driver execution stub to the conventional random access memory region and computing the location of a next selected header until all of the execution stubs corresponding to the plurality of device drivers have been loaded.

17. The method of claim 16 wherein the operating system portion is part of an MS-DOS compatible operating system.

18. The method of claim 16, the initialization code of each header containing device driver data for the corresponding device driver, wherein the step of copying the device driver execution stub to the conventional random access memory region further comprises the step of copying the device driver data to the conventional random access memory region to allow the device driver to modify the device driver data.

19. The method of claim 16 wherein the computer system operates without a disk drive and access to the device driver is provided without emulating a disk drive.

20. The method of claim 19 wherein the computer system loads the plurality of device drivers without a configuration data file that specifies which device drivers to load.

21. The method of claim 16, each header having a shared signature identifying that the header is for a device driver, wherein the step of computing the location of a next selected header further comprises the substep of determining whether the shared signature is present in the header, and wherein the step of repeating the steps of copying the corresponding device driver and computing the location of a next selected header terminates when the substep of determining detects that the shared signature is not present.

22. A method for loading a device driver in a computer system, the computer system having computer memory with an adapter region and a conventional random access memory region, the computer system having a read only memory unit containing an operating system portion, the device driver, and initialization code for loading the device driver, the initialization code having a location on the read only memory unit and having an execution stub for the device driver, the method comprising the computer-implemented steps of:

physically mapping the read only memory unit into the adapter region of computer memory;

transferring control to the operating system portion stored on the read only memory unit;

under control of the operating system portion being executed from the read only memory unit, determining the location of the initialization code; and transferring control to the determined location of the initialization code; and under control of the initialization code being executed from the read only memory unit, determining whether the device driver is to be executed from the conventional random access memory region or from the read only memory unit;

when it is determined that the device driver is to be executed from the conventional random access memory region copying the device driver into the conventional random access memory region; and when it is determined that the device driver is to be executed from the read only memory unit, copying the execution stub to the conventional random access memory region, the stub containing instructions for accessing the device driver such that when code executes the stub, the stub executes the device driver from the read only memory unit.

23. A computer system for providing access to a device driver, the computer system comprising:

computer memory with an adapter region and a conventional random access memory region;

a device driver execution stub having instructions for accessing the device driver such that when code executes the stub, the stub transfers control to the device driver;

initialization code, responsive to being invoked, executes from the adapter region and copies the device driver execution stub to the conventional random access memory region;

an operating system portion, responsive to powering on the computer system, locates the initialization code in the adapter regions and invokes the located initialization code; and a read only memory unit physically mapped into the adapter region, the read only memory unit containing the operating system portion, the initialization code, the device driver, and the device driver execution stub.

24. A computer system for loading a plurality of operating system device drivers in an MS-DOS compatible operating system environment, the computer system operable without a storage disk, the computer system comprising:

computer memory with an adapter region and a conventional random access memory region;

a plurality of headers, each header corresponding to a device driver and containing initialization code for loading the device driver, the initialization code, responsive to being invoked, copies the corresponding device driver to the conventional random access memory region;

a read only memory unit physically mapped into the adapter region of computer memory, the read only memory unit containing the plurality of device drivers with their corresponding headers stored sequentially on the read only memory unit such that the operating system precedes the plurality of device drivers with their corresponding headers and each device driver header precedes the corresponding device driver; and an operating system portion stored on the read only memory unit that, responsive to powering on the computer system, executes from the read only memory unit and computes the location of a selected header, invokes the initialization code of the selected header, and computes the location of a next selected headers so that the plurality of device drivers is located without a configuration file that specifies which device drivers to load.

25. A computer system for providing access to a plurality of device drivers, the computer system comprising:

computer memory with an adapter region and a conventional random access memory region:

a plurality of headers, each header corresponding to a device driver and containing initialization code and an execution stub for the corresponding device driver, the initialization code, responsive to being invoked, copies the execution stub to the conventional random access memory region, the execution stub containing instructions for accessing the device driver such that when code executes the stub, the stub transfers control to the device driver;

a read only memory unit physically mapped into the adapter region of computer memory, the read only memory unit containing the plurality of device drivers with their corresponding headers; and an operating system portion stored on the read only memory unit that, responsive to powering on the computer system, executes from the read only memory unit and computes the location of a selected header, locates the initialization code of the selected header, transfers control to the located initialization code, and computes the location of a next selected header, such that access is provided to the plurality of device drivers without copying the plurality of device drivers to the conventional random access memory region and without using a configuration file to locate each driver to load.

* * * * *

UNITED STATES PATENT AND TRADEMARK OFFICE
CERTIFICATE OF CORRECTION

PATENT NO.    :   5,598,563
DATED         :   January 28, 1997
INVENTOR      :   Terence R. Spies It is certified that errors appear in the above identified patent and that said Letters Patent is hereby corrected as shown below:

In column 9, claim 22, line 22, following "region", please insert --,--.

In column 10, claim 24, line 22, following "selected", please delete "headers" and insert -- header--.

Signed and Sealed this

Twelfth Day of August, 1997

Attest:

BRUCE LEHMAN

*Attesting Officer*        *Commissioner of Patents and Trademarks*